United States Patent [19]
Oldham et al.

[11] 3,854,240
[45] Dec. 17, 1974

[54] ISOTOPICALLY LABELLED COMPOUNDS

[75] Inventors: Kenneth Gordon Oldham, Little Chalfont; Noel Gordon Carr, Liverpool, both of England

[73] Assignee: United Kingdom Atomic Energy Authority, London, England

[22] Filed: Mar. 13, 1972

[21] Appl. No.: 234,326

[30] Foreign Application Priority Data
Mar. 12, 1971 Great Britain...................... 6779/71

[52] U.S. Cl. .............................. 47/1.4, 252/301.1 R
[51] Int. Cl............................................... A01h 13/00
[58] Field of Search...................... 204/158; 47/1.4; 252/301.1

[56] References Cited
UNITED STATES PATENTS
2,602,047  7/1952  Calvin et al......................... 204/158
3,108,402  10/1963  Kathrein ............................... 47/1.4
3,318,773  5/1967  Fujimaki............................. 47/58 X
3,415,928  12/1968  Nadal.................................. 47/1.4 X
3,560,145  2/1971  Ratusky et al. ............... 252/301.1 R
3,579,424  5/1971  Purcell et al................. 252/301.1 R

OTHER PUBLICATIONS

Nuclear Science Abstracts, AEC, Apr. 1970, Vol. 24, No. 14414.

Primary Examiner—Robert E. Bagwill
Attorney, Agent, or Firm—Larson, Taylor and Hinds

[57] ABSTRACT

The micro-organism *Anacystis nidulans* is used in place of Chlorella for the production of $^{14}$C-labelled nucleosides, nucleotides and amino-acids by growing the micro-organism in a medium containing $^{14}$carbon dioxide/bicarbonate as the source of carbon.

6 Claims, No Drawings

ISOTOPICALLY LABELLED COMPOUNDS

This invention relates to the use of certain micro-organisms for the preparation of isotopically labelled compounds.

The use of living cells to convert inorganic forms of radioactive or stable isotopes into more useful organic compounds is not novel. Intact plants, detached leaves and other plant organs, the microscopic green alga Chlorella, sulphur bacilli such as *Thiobacillus thioxidans*, yeasts and other micro-organisms have been used for this purpose.

All the organisms used hitherto for these labelling procedures have certain disadvantages. Higher organisms such as the higher plants and animals suffer severely from radiation damage so that (to take a specific example) they can be used with the isotope carbon-14 only at quite low isotopic abundances. Organisms such as the sulphur bacteria have the advantage that they incorporate carbon dioxide directly, but they are rather slow in growing and this increases their liability to radiation damage. Many other micro-organisms have the disadvantage that they require to be provided with isotopic carbon in organic form such as glucose or acetate. This is disadvantageous because it is more expensive to provide than isotopic carbon dioxide, and it may be difficult to provide it at very high isotopic abundances. For example, although uniformly-labelled glucose may be used as a substrate, this cannot effectively be produced at isotopic abundances greater than 80 percent.

The microscopic green alga Chlorella has been the most generally used intact organism for producing labelled compounds, particularly of carbon-14. The advantages of using Chlorella are set out in various texts (for example, "Carbon-14 Compounds" by J. R. Catch, Chapter 4). It is possible to grow Chlorella having isotopic abundances of carbon-14 as high as 90 to 95 percent.

It is a shortcoming of Chlorella for this purpose that the content of nucleic acid is low, and the content of deoxyribonucleic acid (DNA) in particular is very low. However, when Chlorella is grown at very high isotopic abundances of carbon-14, the cells become greatly enlarged and the proportion of the carbon content recovered as DNA is reduced substantially below the normal low level. Chlorella is therefore a very inefficient source of DNA labelled with carbon-14 at high isotopic abundance and consequently of deoxyribonucleotides and deoxyribonucleosides.

The present invention provides a method of making an isotopically labelled compound, which method comprises growing a micro-organism of the genus Anacystis in a medium containing the isotope in question in a form which is taken up by the micro-organism.

The preferred species of *Anacystis* is *Anacystis nidulans*, a microscopic blue-green alga, which is alternatively known as *Anacystis maxima*, *Phormidium mucicola*, or *Lauterbornia nidulans*. Included within the scope of the invention is the use of mutants, whether naturally occurring or artifically induced, of the standard strain of *Anacystis nidulans*.

*Anacystis nidulans* is a photsynthetic micro-organism, and requires only water, inorganic salts, light and carbon dioxide/bicarbonate as the sole source of carbon for growth. This invention is principally concerned with the use $^{14}CO_2$ as the source of the isotope. Under suitable conditions, the micro-organism takes up the $^{14}CO_2$ quite rapidly, and the $^{14}C$ becomes progressively distributed throughout the various molecules of the organism.

Accordingly, this invention provides, in its preferred aspect, a method of making a $^{14}C$-labelled compound, particularly one selected from the group consisting of nucleosides, nucleotides and amino-acids, which method comprises growing a micro-organism of the species *Anacystis nidulans* in a medium containing carbon dioxide bicarbonate, in which $^{14}C$ is present preferably at an isotopic abundance of substantially 100 percent, as a source, and preferably the sole source, of carbon.

The conditions under which *Anacystis nidulans* may be grown are known and are similar to those for the growth of Chlorella; so the conditions will not be described in detail here. It is possible, and will generally be preferable, to use substantially 100 percent $^{14}CO_2$, though lower isotopic abundances of carbon-14 in the $CO_2$ may be used if desired. After growth has been completed, or has progressed as far as is desired, the algae are harvested and may be treated by known methods as required to recover the isotopically labelled compound or compounds desired. *Anacystis nidulans* can be used to produce isotopically labelled compounds such as protein, amino-acids, nucleosides, nucleotides, nucleic acids, deoxynucleosides, deoxynucleotides, deoxynucleic acids, fatty acids, steroids and other lipids, and growth factors labelled with stable or radioactive isotopes. Advantages obtainable by the use of *Anacystis nidulans* in place of Chlorella are as follows:

A. Growth rate

*Anacystis nidulans* can be made to grow with a shorter generation time (time to double cell numbers) than Chlorella and hence grows faster. On non-radioactive $CO_2$ and under optimum conditions A. nidulans can be grown with a generation time of ca 2 hours whereas the optimum for Chlorella is 5 to 6 hours. We have not been force to grow *A. nidulans* under absolute optimum conditions but have standardised conditions giving a generation time of 5 to 6 hours. As a result slight changes in environment pH, light, temperature, etc., do not have a significant effect on growth rate, so that the operation is more reliable. Chlorella has to be grown under optimum conditions at high carbon-14 specific activity to get good growth, consequently small changes in environment can have a marked deleterious effect on growth.

B. Radiation resistance

*Anacystis nidulans* is more resistant to radiation than Chlorella and this has the following advantages:

1. On growth at high carbon-14 specific activity the generation time of *Anacystis nidulans* remains constant and growth is complete in ca 24 hours. Chlorella however suffers radiation damage and each successive generation takes longer (giving an almost exponential increase in generation time). Consequently, although under our growth conditions there is little difference between the initial generation times of the two organisms, growth with Chlorella takes from 48 to 72 hours to reach completion (i.e., 2 to 3 times as long as *Anacystis nidulans*).

2. When cells are grown on $CO_2$ at high specific activity, radiation damage causes Chlorella to produce cells which are much larger and more fragile than those grown on non-radioactive $CO_2$. These larger cells lyse easily and potentially useful cell contents are lost into the supernatant from which they cannot easily be recovered. There is no visible difference between *Anacystis nidulans* cells grown on high specific activity $^{14}CO_2$ and those grown and non-radioactive carbon dioxide. Losses by cell lysis are smaller than with Chlorella and ca 85 percent of the initial $^{14}CO_2$ is incorporated into whole cells compared with 75 to 80 percent for Chlorella.

3. Perhaps because cells of Chlorella increase in size at high carbon-14 specific activity, the DNA content per cell decreases as the specific activity increases; this does not happen with *Anacystis nidulans*.

4. We use an inoculum of ca 5 percent in photosynthetic work to avoid both a drop in specific activity and the danger of non-uniform labelling of products; this requires 4 to 5 generations for growth to reach completion (i.e. complete $^{14}CO_2$ uptake). If Chlorella growth gets off to a bad start (i.e. a longer than usual initial generation time) due, for example, to variation in the environment giving sub-optimal conditions, it will suffer excessive radiation damage and growth may not reach completion or, if it does reach completion ultimately, excessive cell lysis and consequent loss of useful material will occur during the latter stages of growth.

C. Nucleic acid content

At high carbon-14 specific activity (ca 95 percent isotopic abundance) the nucleic acid contents of *Anacystis nidulans* and Chlorella are as follows:

|  | Total nucleic acids | DNA | RNA (by difference) |
|---|---|---|---|
| Anacystis nidulans | 6.5% | 1.7% | 4.8% |
| Chlorella | 3.7% | 0.2% | 3.5% | i.e., *Anacystis nidulans* contains ca twice as much nucleic acid as Chlorella, (8½ times as much DNA and 1.3 times as much RNA).

D. Protein content

*Anacystis nidulans* yields ca 10 percent more protein than Chlorella.

There follows a description of a preferred method of operating the process of this invention.

Growth of *Anacystis nidulans* on $^{14}CO_2$ at ca. 100 percent isotopic abundance The organism may be grown in any apparatus of the kind already described for growing Chlorella-C14. Examples of various kinds are described by J. R. Catch ("Radioisotope Conference 1954,"Vol. 1, p. 337. Butterworth, London, 1954): R. W. Dutton and C. E. Dalgliesh (J. Chem. Soc., 1956, 3792); P. H. Abelson, et al., ("Studies in Biosynthesis of *E. coli*," Chapter 4, Carnegie Institute, Washington, 1955); Z. Nejedly, J. Filip, D. Grünberger ("Methods of Preparing and Storing Labelled Compounds," pp.527–537, Euratom, Brussels, 1968); J. Liebster, J. Kopoldova, J. Kozel, M. Dobiasova, (Coll. Czech. Chem. Commun. 1961, 26, 1582); P. D. Ellner, (Plant Phys., 1959, 34, 638–40). The preferred process uses a system having a liquid volume of approximately 5 litres and a gas volume of approximately 20 litres, provided with means for agitation and/or gas circulation to facilitate the uptake of carbon dioxide from the gaseous phase into the liquid. Such a system allows for the incorporation of 100 milligram-moles of carbon-14 dioxide, equivalent to 6.2 Curies at 100 percent isotopic abundance. The liquid is illuminated artifically with four banks of lights each having four 2 ft. "Warmlight" or "Gro-lux" fluorescent tubes. The temperature is maintained at 37°C by a thermostatted water-jacket.

The growth medium used is a modification of a standard inorganic medium, supplemented with trace metal ions, routinely used for the growth of Chlorella and other phososynthetic micro-organisms (see "Growth of Phototropic Bacteria and Blue-Green Algae" by N. G. Carr in "Methods in Microbiology," edited by J. R. Norris and D. W. Ribbons, Academic Press, London, and New York, Volume 3B, pp. 53–57, 1970). This modification consists of a higher than usual concentration of phosphate to increase the buffer capacity and so reduce pH changes which occur during growth particularly in closed system.

The inoculum, equivalent to 5 percent of the final weight of *Anacystis nidulans*, is taken from a culture of non-radioactive *Anacystis nidulans* in the exponential phase of growth. This culture is produced by inoculating from an agar slope of *Anacystis nidulans* into 50 mls of growth medium in a 500 ml conical flask and incubating this (in an atmosphere of 5 percent carbon dioxide in air) in an orbital shaker, illuminated by two 40 watt "daylight" fluorescent tubes at a distance of 28 cms, to produce inoculum for 500 mls of medium in a 1 litre cylindrical growth vessel (40 cms × 7 cms) maintained at 37°C by a thermostatted water-jacket, illuminated by six 40-watt "daylight" fluorescent tubes at a distance of 20 cms, and aerated at a rate of 1.0 to 1.5 litres per minute with sterile air containing 2 to 5 percent carbon dioxide. This produces, in 24 to 36 hours, a rapidly growing culture from which the 5 litre preparative growth medium is inoculated.

After sterilisation by autoclaving, ca 5 litres of growth medium is transferred aseptically to a sterilised growth vessel through a sampling tune and is inoculated during transfer. When transfer and inoculation are completed the air pressure in the growth vessel is reduced to ca 0.5 atmospheres, 100 m. moles of carbon-14 dioxide (6.2 Curies at 100 percent isotopic abundance) is generated by the addition of dilute perchloric acid to 100 m.moles of barium carbonate-C14 in a simple generation vessel of the type normally used for synthetic work with carbon-14 dioxide. The carbon-14 dioxide is flushed into the growth vessel with air until the pressure inside the vessel is ca 8 cms Hg below atmospheric pressure so that any leakage during growth will be of air into the vessel rather than of carbon-14 dioxide out of the vessel.

A sample is removed immediately after carbon-14 dioxide generation and its pH is measured to ensure that it is correct (pH 7.4). Samples are removed at intervals thereafter and growth is monitored by measuring the sample's pH, optical density at 380 nm, total radioactivity (dissolved carbon-14 dioxide, cells and labelled products excreted into the medium), radioactivity after acidification (cells and labelled products excreted into the medium), and radioactivity retained by a Millipore membrane filter (cells).

After ca 14 hours when growth is ca 50 percent complete the pH starts to rise and acid is added at intervals to ensure that the pH does not rise above pH 8.5. As growth nears completion the pH ceases to rise and activity determinations show that less than 5 percent of the original carbon-14 dioxide remains in solution. The cells are then harvested.

The small amount of unincorporated carbon-14 dioxide is recovered by circulating the air in the vessel through an alkaline trap containing 100 ml of 4N potassium hydroxide. The cells (which contain ca 85 percent of the total radioactivity) are then separated from the supernatant (which contains ca 10 percent of the total radioactivity) by centrifugation in a refrigerated centrifuge (ca 4°C) fitted with a flow rotor. They are then processed rapidly to reduce possible losses of high molecular weight nucleic acids by radiation degradation.

Processing labelled Anacystis nidulans cells

Lipids, which consist of ca 15 percent of the total activity of the cells, are isolated from the centrifuged cells by solvent extraction, twice with absolute ethanol and finally with ethanol:chloroform (9:1). The solvent is removed in a stream of nitrogen and the residual lipid material is dissolved in benzene and sealed under nitrogen in glass ampoules for subsequent processing by standard methods.

The residue remaining after lipid extraction, is suspended in a small volume (ca 30 ml) of distilled water, sonicated for 10 minutes, and centrifuged. The supernatant is removed and the residue re-suspended in a small volume of water and the sonication process repeated. The two supernatants, which contain low molecular weight water-soluble compounds, are bulked and the insoluble residue, containing chiefly protein and nucleic acids, is processed to separate the nucleic acid components from the protein.

A deoxynucleotide-rich fraction is obtained by treating a suspension of this residue with ribonuclease-free deoxyribonuclease I which degrades the high molecular weight water-insoluble DNA to water-soluble oligo-deoxyribonucleotides. When reaction is complete the oligo-deoxynucleotide fraction is isolated by centrifugation and converted to a mixture of the four deoxyribonucleoside monophosphates (deoxyandenosine-5'-monophosphate, deoxycytidine-5'-monophosphate, deoxyguanosine-5'-monophosphate and thymidine-5'-monophosphate) by treatment with phosphatase-free purified snake venom phosphodiesterase. The four deoxyribonucleoside monophosphates are then isolated in a pure form from this mixture by standard methods using DEAE-Sephadex column, paper, and thin-layer chromatography.

An RNA-rich fraction is next isolated from the residue which remains after DNAse treatment, by extraction with hot 10 percent sodium chloride solution. RNA is isolated from this 10 percent sodium chloride extract by ethanol precipitation and is then degraded to yield a mixture of the four ribonucleoside monophosphates (adenosine-5'-monophosphate, cytidine-5'-monophosphate, guanosine-5'-monophosphate, and uridine-5'-monophosphate) by treatment with a phosphatase-free purified snake venom phosphodiesterase. The ribonucleoside monophosphates are subsequently isolated in a pure form from this mixture by standard methods using DEAE-Sephadex column, paper, and thin-layer chromatography.

The insoluble residue remaining after the sodium chloride extraction of nucleic acids, consists chiefly of isoluble protein and is hydrolysed with hydrochloric acid by a standard method. The protein hydrolysate (whose radioactivity is approximately 60 percent of that of the harvested cells) so formed is fractionated by standard methods to yield radiochemically pure amino-acids.

We claim:

1. In a method of making a $^{14}$C-labeled compound by growing a micro-organism in a medium provided with a high isotopic abundance of $^{14}$C in a form in which it is taken up by the micro-organism, harvesting the organism after the vegetative reproduction thereof and recovering the $^{14}$C-labelled compound therefrom, the improvement which consists in using as the microorganism a micro-organism of the genus Anacystis.

2. A method as claimed in claim 1, wherein the medium contains carbon dioxide/bicarbonate in which the $^{14}$C is present a a source of carbon.

3. A method as claimed in claim 2, wherein the $^{14}$C-labelled compound is one selected from the group consisting of nucleosides, nucleotides and amino-acids.

4. A method as claimed in claim 2, wherein the carbon dioxide/bicarbonate contains $^{14}$C in substantially 100 percent isotopic abundance.

5. A method as claimed in claim 2, wherein the carbon dioxide/bicarbonate constitutes the sole source of carbon in the medium.

6. A method as claimed in claim 1, wherein the micro-organism is of the species *Anacystis nidulans*.

* * * * *